United States Patent
Inanc et al.

(10) Patent No.: US 9,261,622 B2
(45) Date of Patent: Feb. 16, 2016

(54) ELEMENTAL CONCENTRATION DETERMINATION USING NEUTRON-INDUCED ACTIVATION GAMMA RADIATION

(75) Inventors: Feyzi Inanc, Spring, TX (US); Rafay Zahid Ansari, Spring, TX (US); W. Allen Gilchrist, Fort Davis, TX (US); David M. Chace, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 139 days.

(21) Appl. No.: 13/223,522

(22) Filed: Sep. 1, 2011

(65) Prior Publication Data

US 2012/0056083 A1  Mar. 8, 2012

Related U.S. Application Data

(60) Provisional application No. 61/379,711, filed on Sep. 2, 2010.

(51) Int. Cl.
*G01V 5/08* (2006.01)
*G01V 5/10* (2006.01)

(52) U.S. Cl.
CPC ........................................ *G01V 5/101* (2013.01)

(58) Field of Classification Search
CPC ............ G01V 5/101; G01V 5/10; G01V 5/04
USPC ........................................................ 250/269.1
See application file for complete search history.

(56) References Cited

U.S. PATENT DOCUMENTS

| 3,536,918 | A | * | 10/1970 | Richardson ................. 250/252.1 |
| 3,943,362 | A | | 3/1976 | Peelman |
| 4,008,392 | A | | 2/1977 | Lock et al. |
| 4,122,338 | A | | 10/1978 | Smith, Jr. et al. |
| 4,228,350 | A | * | 10/1980 | Paap et al. ..................... 250/267 |
| 4,501,964 | A | | 2/1985 | Arnold |
| 4,731,531 | A | | 3/1988 | Handke |
| 4,937,446 | A | | 6/1990 | McKeon et al. |
| 5,128,541 | A | | 7/1992 | Mahdavi et al. |
| 5,374,823 | A | | 12/1994 | Odom |
| 5,406,078 | A | * | 4/1995 | Jacobson ...................... 250/261 |
| 6,207,953 | B1 | | 3/2001 | Wilson |
| 6,607,886 | B2 | | 8/2003 | Hovig et al. |
| 7,205,535 | B2 | | 4/2007 | Madigan et al. |
| 7,227,129 | B2 | | 6/2007 | Riley et al. |
| 7,554,081 | B2 | | 6/2009 | Riley et al. |
| 7,566,869 | B2 | | 7/2009 | Riley et al. |
| 7,630,469 | B2 | | 12/2009 | Akers |
| 7,933,718 | B2 | | 4/2011 | McDaniel et al. |

(Continued)

*Primary Examiner* — David J Makiya
*Assistant Examiner* — Taeho Jo
(74) *Attorney, Agent, or Firm* — Mossman Kumar & Tyler PC

(57) ABSTRACT

The present disclosure relates to borehole logging methods and apparatuses for estimating formation properties using nuclear radiation, particularly an apparatus and method for estimating amounts of silicon and/or oxygen in the formation using exposure time information. The method may include using nuclear radiation information from at least one nuclear radiation detector to estimate at least one parameter of interest. The method may also include reducing an error in the estimated formation properties due to speed variations of a nuclear radiation source that activates the silicon and oxygen in the formation. The apparatus may include at least one nuclear radiation detector. The apparatuses may include an information processing device to perform the methods.

18 Claims, 9 Drawing Sheets

(56) References Cited

U.S. PATENT DOCUMENTS

| | | |
|---|---|---|
| 8,230,916 B2 * | 7/2012 | Sumrall et al. ............ 166/250.01 |
| 8,440,961 B2 * | 5/2013 | Inanc et al. ................ 250/269.7 |
| 2003/0161431 A1 | 8/2003 | Akers |
| 2004/0020646 A1 * | 2/2004 | Flecker et al. ............. 166/253.1 |
| 2005/0121606 A1 * | 6/2005 | Gilchrist et al. ........... 250/269.1 |
| 2007/0145259 A1 * | 6/2007 | Gilchrist et al. ........... 250/269.1 |
| 2007/0241275 A1 * | 10/2007 | Guo et al. .................. 250/269.1 |
| 2008/0156976 A1 * | 7/2008 | Gilchrist et al. ........... 250/269.1 |
| 2009/0090505 A1 * | 4/2009 | McDaniel et al. ......... 166/250.1 |
| 2009/0126928 A1 * | 5/2009 | Sumrall et al. ........... 166/250.01 |
| 2009/0150077 A1 * | 6/2009 | Stoller et al. ...................... 702/8 |
| 2010/0252726 A1 * | 10/2010 | Inanc et al. ................ 250/269.3 |
| 2010/0332138 A1 * | 12/2010 | Inanc et al. ....................... 702/8 |
| 2011/0180697 A1 | 7/2011 | Inanc et al. |
| 2011/0213555 A1 | 9/2011 | Kopal et al. |

* cited by examiner

US 9,261,622 B2

ELEMENTAL CONCENTRATION DETERMINATION USING NEUTRON-INDUCED ACTIVATION GAMMA RADIATION

CROSS-REFERENCES TO RELATED APPLICATIONS

This application claims priority from U.S. Provisional Patent Application Ser. No. 61/379,711, filed on 2 Sep. 2010, incorporated herein by reference in its entirety.

FIELD OF THE DISCLOSURE

In one aspect, this disclosure generally relates to borehole logging methods and apparatuses for estimating formation properties using nuclear radiation based measurements. More particularly, this disclosure relates to estimating one or more formation parameters of interest using information obtained from a formation exposed to a neutron source.

BACKGROUND OF THE DISCLOSURE

Oil well logging has been known for many years and provides an oil and gas well driller with information about the particular earth formation being drilled. In conventional oil well logging, during well drilling and/or after a well has been drilled, a nuclear radiation source and associated nuclear radiation detectors may be conveyed into the borehole and used to determine one or more parameters of interest of the formation. A rigid or non-rigid carrier is often used to convey the nuclear radiation source, often as part of a tool or set of tools, and the carrier may also provide communication channels for sending information up to the surface.

SUMMARY OF THE DISCLOSURE

In aspects, the present disclosure is related to methods of estimating at least one parameter of interest of a formation using induced gamma radiation detected from a subterranean formation.

One embodiment according to the present disclosure includes a method for estimating at least one parameter of interest of a formation, comprising: estimating the at least one parameter of interest using at least one nuclear radiation detector and exposure time information.

Another embodiment according to the present disclosure includes an apparatus for estimating at least one parameter of interest of a formation, comprising: a carrier; at least one nuclear radiation detector conveyed by the carrier and configured to generate information representative of nuclear radiation from an activated volume of interest; and an information processing device configured to estimate the at least one parameter of interest using the nuclear radiation information and exposure time information.

Another embodiment according to the present disclosure includes a non-transitory computer-readable medium product having stored thereon instructions that, when executed by at least one processor, perform a method the method comprising: estimating the at least one parameter of interest using information acquired from at least one nuclear radiation detector and exposure time information.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
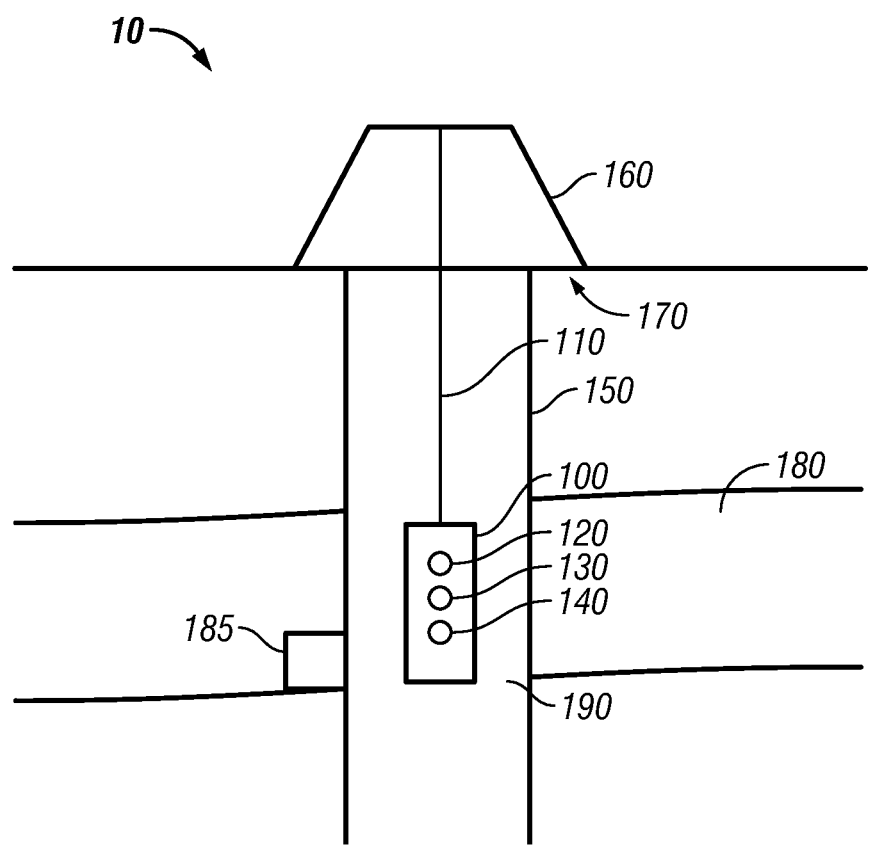
FIG. 1 shows a schematic of a downhole tool deployed in a borehole along a wireline according to one embodiment of the present disclosure.

In aspects, this disclosure relates to estimating amounts of silicon and/or oxygen in a subterranean formation. The application of fast neutrons (over about 10 MeV for O-16) to the volume of interest of a formation may "activate" specific elements (such as silicon and oxygen). Herein, to "activate" an element means to bombard the element with neutrons so as to produce a radioactive isotope. For example, some of the oxygen-16, when struck by a neutron, may be transmuted into nitrogen-16 due to a neutron-proton reaction (where the atomic weight remains the same but the charge of the nucleus is reduced). In another example, some of the silicon-28 may be changed to aluminum-28 through (n,p) reaction as well. Activation is not limited to neutron-proton reactions, as radiative capture (n,y) of thermal neutrons may also be used, such as for production of sodium-24 from sodium-23 and iodine-128 from iodine-127. Activation may be initiated by an energy source, such as a pulsed or constant neutron source, that may be conveyed in a borehole in proximity to the subterranean formation. The speed of an active energy source while it is traveling in proximity to a volume of interest of the formation may determine the amount of activation that takes place in the volume of interest. The response from the formation may be in the form of prompt and/or delayed nuclear radiation, such as gamma rays from the radioactive decay of the isotopes, and the amount of nuclear radiation may be a function of the amount of radioactive isotopes present. Herein, nuclear radiation includes particle and non-particle radiation emitted by atomic nuclei during nuclear processes (such as radioactive decay and/or nuclear bombardment), which may include, but are not limited to, photons from neutron inelastic scattering and from neutron thermal capture reactions, neutrons, electrons, alpha particles, beta particles, and pair production photons. As such, the amount of specific elements present in the formation may be estimated using the amount of nuclear radiation detected from isotopes related to the specific elements, though the isotopes may not be isotopes of the specific elements. The amount of isotopes formed by the at least one energy source may vary with the amount of the specific elements present in the formation and the amount of exposure to the at least one energy source.

For example, estimating the amount of silicon may use information from a nuclear radiation detector that is indicative of gamma radiation resulting from the radioactive decay of aluminum-28. Herein, "information" may include raw data, processed data, analog signals, and digital signals. The amount of aluminum-28 may, generally, be related to the amount of silicon activated by the at least one energy source. As the at least one energy source moves through a borehole, exposure time, which may be independently measured or may be derived from speed information of the movement of the at least one energy source and/or the at least one nuclear radiation detector, may be recorded and used to establish an exposure time for the volume of interest due to the at least one energy source. Herein, "exposure times" may include (i) the time period that the volume of interest is exposed to the active energy source, (ii) the time period that the at least one nuclear radiation detector is exposed to nuclear radiation emitted by the volume of interest, and (iii) the intervening period between exposure of volume of interest and exposure of the at least one nuclear radiation detector by the volume of interest. Exposure times may include the time period when the volume of interest or at least one nuclear detector are receiving nuclear radiation, regardless of whether the at least one energy source and/or the at least one nuclear detector are (i) stationary, (ii) moving at a constant speed, (iii) moving at a variable speed, or (iv) a combination thereof. Exposure times may be directly or indirectly estimated. In some embodiments, one or more exposure times may be estimated using one or more sensors located on the carrier, in the borehole, or at the surface. In some embodiments, exposure times for each of the detectors may be estimated independently. In some embodiments, an exposure time may be estimated as a period of time where the at least one energy source or a detector is present in an exposure zone, where the exposure zone is a volume of space or a range (or band) along a path where the at least one energy source will irradiate the volume of interest or the volume of interest will irradiate one or more nuclear radiation detectors. By relating the exposure time information to the information acquired from at least one nuclear radiation detector, the amount of silicon present in the formation may be estimated. A minimum rate or amount of radiation may be required to establish when "exposure" is taking place. In some embodiments, "exposure" may be based on levels of naturally occurring radiation within the formation, such as when radiation from the source or volume of interest is higher than background radiation levels, and/or operational considerations. Using exposure time information to reduce errors due to speed variations may be performed regardless of whether the average logging speed is high or low and whether the borehole is horizontal, deviated, or vertical.

At low logging speeds, the amount of silicon may be estimated, generally, using nuclear radiation information acquired and, optionally, by compensating for variations in speed that alter exposure times of the volume of interest. While, at higher logging speeds, speed variations may increase or decrease, these speed variations may still be compensated for by using exposure time information. However, higher logging speeds may introduce additional nuclear radiation that may not be present at low logging speeds. Basically, the nuclear radiation information acquired at higher logging speeds may be composed of more than a single radiation component.

Faster logging may be desirable for efficiency at the wellsite, but results in the detection of activation gamma rays from two or more elements. The present disclosure provides methods for separation of multiple element signals at faster logging speeds. And determining both silicon and oxygen in a single pass may be more beneficial than just determining one or the other. Herein, the division between low and high logging speeds is the point where the nuclear radiation detectors are moving fast enough that, when the nuclear radiation detectors pass the activated volume of interest, nuclear radiation contributions from nitrogen-16 are significant to the overall nuclear radiation level. Determination of whether a nuclear radiation contribution is significant may be based on, but not limited to, one or more of: (i) radiation contribution by naturally occurring radioactivity in the formation, (ii) operational considerations, (iii) type or number of radiation detectors used. In some embodiments, background radiation due to naturally occurring radioactive materials or activation of elements in the nuclear radiation detectors may be filtered out prior to separation of the multiple element signals. For example, a bismuth germinate (BGO) detector may generate its own gamma count due to activation of the oxygen in the BGO detector due to exposure to the at least one energy source.

As will be understood by those of skill in the art, nitrogen-16 has a half-life of about 7.13 seconds, while aluminum-28 has a half-life of about 134.5 seconds. The short half-life of nitrogen-16 leads to a nitrogen-16 nuclear radiation component that will decrease much more quickly than the aluminium-28 nuclear radiation component. Hence, at low logging speeds, the nitrogen-16 nuclear radiation component may be insignificant or too small to be effectively measured by the time the at least one nuclear radiation detector in proximity to the volume of interest, thus only the aluminum-28 nuclear radiation component may be used. However, at high logging speeds, both nitrogen-16 and aluminum-28 nuclear radiation components will be detectable. Thus, given the characteristics of the at least one energy source and the spacing of the one or more detectors, the threshold between low and high logging speed may be the speed above which nuclear radiation from nitrogen-16 and aluminum-28 may be significant and below which only nuclear radiation from aluminum-28 may be significant. In the past, the overlapping nuclear radiation components may have interfered with the accuracy of estimates of the amount of silicon in the formation. In general, if the measurement is toward determining oxygen content, logging speed should be high so that nitrogen-16 photons can be recorded before they decay to insignificant levels. Since there will be photons from other activated isotopes, nitrogen-16 counts can be determined only if they can be separated from the total counts. If the measurement targets a slower decaying isotope, such as aluminum-28, the logging speed can be slower to eliminate counts from nitrogen-16 decay but this may be go against the desire to finish the logging in a reasonable time frame.

An activated volume of interest may have several radioactive isotopes (radionuclides), which generate nuclear radiation that may be separated using methods and apparatuses disclosed in the present disclosure. Thus, the present disclosure provides methods and apparatuses for estimating and separating nuclear radiation components of any one or more different radionuclides (man-made or naturally occurring) at any logging speed. Some embodiments may include separating nuclear radiation components that include, but are not limited to, two or more of: (i) nitrogen-16, (ii) neon-23, (iii) sodium-24, (iv) magnesium-27, (v) aluminum-28, (vi) manganese-56, (vii) cobalt-58, (viii) cobalt-60, and (ix) iodine-128. In some embodiments, radiation information related to the two different radionuclides may be separated using the different rates of radioactive decay of each of the radionuclides. In other embodiments, the radiation information related to the two different radionuclides may be separated using energy spectrum information of the different radionuclides. Energy spectrum information may be separated using, but not limited to, one of: (i) deconvolution, (ii) stripping and (iii) a window technique or (iv) a combination of these techniques.

The present disclosure provides methods and apparatuses for performing logging at high speeds by separating a gross nuclear radiation count into separate components, thus each radioactive isotope may provide a radiation component. In the case of high logging speeds, the separated components may allow for the estimation of the amount of silicon and/or oxygen or others in the formation and in the tool body. The apparatus may include at least one energy source and at least one nuclear radiation detector. In some embodiments, the at least one energy source may be a nuclear radiation source, such as, but not limited to, one or more of (i) a pulsed neutron source and (ii) a constant neutron source. While nuclear radiation detectors may be used to detect nuclear radiation from the formation, the detectors are not limited to detecting nuclear radiation of the same type as emitted by the at least one energy source. The at least one detector may have shielding to prevent the counting of nuclear radiation from unintended sources. Logging may include, but is not limited to, acquiring information for estimating one or more of: (i) a silicon content, (ii) an oxygen content, (iii) a sodium content, (iv) an iodine content, and (v) an iron content, (vi) an aluminum content, and (vii) a magnesium content.

The present disclosure also provides methods and apparatuses for estimating at least one parameter of interest in a formation using oxygen content information and at least a formation lithology. Lithology may include mineralogy, combinations of mineralogies, rock characteristics, rock structure, and rock composition. For the purposes of this disclosure, lithology does not include porosity. For example, in one embodiment, water saturation may be estimated using oxygen content information along with the formation lithology. Content information may include, but is not limited to, one or more of: (i) absolute concentration, (ii) relative concentration, (iii) ratio by volume, (iv) ratio by mass, and (v) mass. Oxygen content may be estimated using prompt and/or delayed gamma rays from neutron inelastic scattering and/or gamma rays from oxygen activation based on either time spectrum and/or energy spectrum of gamma rays from those reactions and other techniques known to those of skill in the art. As different minerals and mineral combinations have different amounts of oxygen, the formation lithology may be used to establish a model that may be used to estimate the water saturation using the oxygen content. The model may include at least one predicted value for comparison with an estimated oxygen content. In some embodiments, the estimation of water saturation may include using porosity information in addition to estimated oxygen content and formation lithology.

In one embodiment, the model may include a predicted maximum value and a predicted minimum value for the oxygen content for a formation lithology. The estimated oxygen content may be compared with the predicted maximum value for oxygen and the predicted minimum value for oxygen, and this comparison may be used to estimate a value for water saturation in the formation. In some embodiments, water saturation may be estimated using a model that comprises a linear or non-linear relationship (depending on the formation lithology) between the predicted maximum value for oxygen and the predicted minimum value for oxygen, where the position of the oxygen content along the curve may provide the estimated water saturation. The curve may be linear or non-linear. In some embodiments where the model is linear, the value of water saturation may be estimated by the formula:

$$S_w = \frac{(O \text{ measured} - O \text{ oil})}{(O \text{ water} - O \text{ oil})} = \frac{O \text{ measured} - O \text{ oil}}{\Delta O},$$

where $S_w$ is the value of water saturation, $O_{measured}$ is the value of estimated oxygen content, $O_{oil}$ is the predicted minimum value for oxygen content, $O_{water}$ is the predicted maximum value for oxygen content, and $\Delta O$ is the size of the range between the predicted maximum and predicted minimum values for oxygen.

The water saturation may be estimated based on the relative position of the estimated oxygen content within a range of possible oxygen levels. This estimate may be clarified based on variations in formation characteristics (e.g., lithology).

FIG. 1 schematically illustrates a drilling system 10 having a downhole tool 100 configured to acquire information for estimating at least one parameter of interest of a formation 180. In one illustrative embodiment, the tool 100 may contain an energy source 140 and associated detectors 120, 130. Some embodiments may include multiple energy sources spaced along the longitudinal axis of the borehole 150. The use of two detectors is exemplary and illustrative only, as some embodiments may use a single detector. The system 10 may include a conventional derrick 160 erected on a derrick floor 170. A carrier 110, which may be rigid or non-rigid, may be configured to convey the downhole tool 100 into borehole 150 in proximity to formation 180. The carrier 110 may be a drill string, coiled tubing, a slickline, an e-line, a wireline, etc. Downhole tool 100 may be coupled or combined with additional tools (e.g., some or all the information processing system of FIG. 11). Thus, depending on the configuration, the tool 100 may be used during drilling and/or after the borehole 150 has been formed.

The nuclear radiation source 140 emits nuclear radiation into the volume of interest 185 of the formation 180 to be surveyed. This nuclear radiation interacts with the nuclei of the atoms of the material of the formation to produce new isotopes as a result of various nuclear reactions and causing the release of at least one of: (i) inelastic gamma rays and (ii) capture gamma rays. Inelastic, capture gamma rays and gamma rays from the decay of activation products will, in turn, undergo Compton scattering and pair production reactions and will generate a secondary gamma ray source. In one embodiment, the downhole tool 100 may use a pulsed neutron generator emitting 14.2 MeV fast neutrons as its energy source 140. The use of 14.2 MeV neutrons from a pulsed neutron source is illustrative and exemplary only, as different energy levels of neutrons may be used; energy source 140 may be continuous for some embodiments. In some embodiments, the at least one energy source 140 may be controllable in that the nuclear radiation source may be turned "on" and "off" while in the borehole, as opposed to a nuclear radiation source that is "on" continuously. Due to the intermittent nature of the nuclear radiation source, the inelastic and capture photons created will reach the detectors 120, 130 during different time periods. Inelastic photons are generated predominantly during the pulse, while capture photons are generated during and after the pulse. Although gamma rays from decay of the activation products can be recorded all along, they will be separated from inelastic and capture gamma rays in time periods where enough time elapsed for all thermal neutron capture reactions to die away.

The detectors 120, 130 provide signals that may be used to estimate the nuclear radiation count returning from the formation. Generally, detectors 120, 130 are spaced in a substantially linear fashion relative to the nuclear radiation source along the longitudinal axis of the borehole. If two detectors are used, there may be a short spaced (SS) detector and a long spaced (LS) detector, wherein the detectors have different distances from the nuclear radiation source. For instance, in one embodiment, detector 130 may be a short spaced detector, and detector 120 may be a long spaced detector. The SS and LS detectors are not limited to being placed on the same side of the nuclear radiation source and their spacing from the nuclear radiation source may be the same or different. In some embodiments, at least one detector 120, 130 may be co-located with the at least one energy source 140. Additional detectors may be used to provide additional nuclear radiation information. At least one of the detectors may be a gamma ray detector. Nuclear radiation shielding (not shown) may be located between energy source 140 and the detectors 120, 130. Nuclear radiation shielding may include, but is not limited to, gamma-ray shielding and neutron shielding. Drilling fluid 190 may be present between the formation 180 and the downhole tool 100, such that emissions from energy source 140 may pass through drilling fluid 190 to reach formation 180 and nuclear radiation induced in the formation 180 may pass through drilling fluid 190 to reach the detectors 120, 130. In some embodiments, electronics (not shown) associated with the detectors may be capable of recording counts from axially spaced detectors 120, 130.

Figure 2:
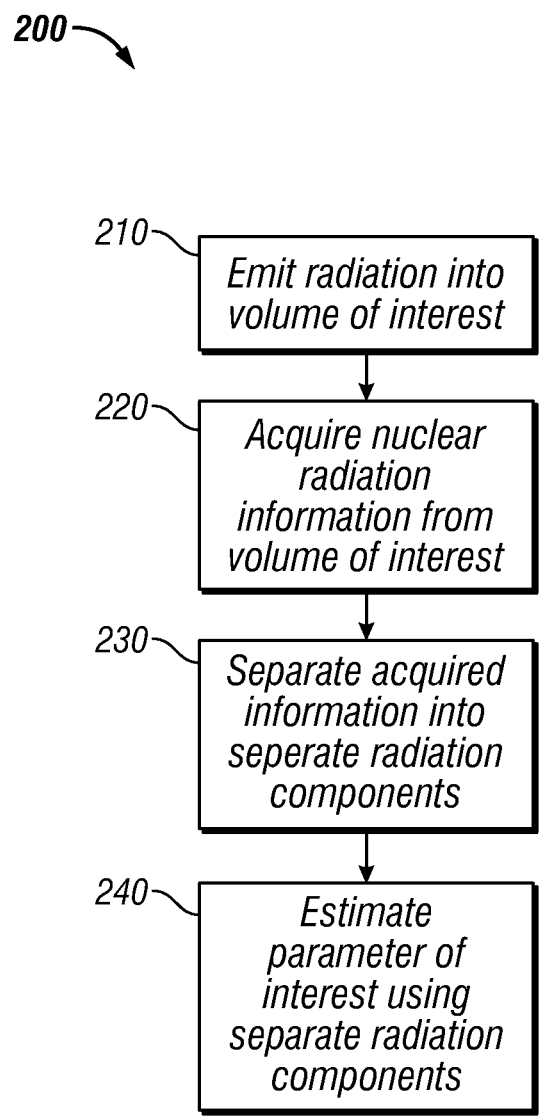
FIG. 2 shows a flow chart of an estimation method for one embodiment according to the present disclosure.

FIG. 2 shows, in flow chart form, an exemplary method 200 according to the present disclosure for estimating at least one parameter of interest of the formation 180 (FIG. 1) using a model based on information acquired from the two nuclear radiation detectors 120, 130 (FIG. 1). Referring now to FIGS. 1 and 2, method 200 may include step 210, where the at least one energy source 140 emits a nuclear radiation pulse (such as a neutron pulse) in proximity to a volume of interest 185 of the formation 180. In step 220, the resulting interactions between the pulse and the material of the formation result in nuclear radiation that may be detected by the nuclear radiation detectors 130, 120 as the detectors 120, 130 move past, or in proximity to, the volume of interest 185. The detectors 120, 130 may, produce a signal with the nuclear radiation information acquired from the volume of interest 185. Herein, the neutron interactions may include, but are not limited to, elastic and inelastic scattering, thermal neutron capture, neutron-proton (n,p) reactions and gamma ray interactions include pair production, Compton scattering, Raleigh scattering, and the photoelectric effect. In step 230, the information may be separated into separate nuclear radiation components, which may represent gamma rays from nitrogen-16 and aluminum-28. In step 240, the separate nuclear radiation components may be used to estimate the amounts of silicon and/or oxygen present in the volume of interest 185. In some embodiments, where the logging speed is slow enough that nitrogen-16 nuclear radiation component has significantly decreased before the detectors reach the volume of interest 185, step 230 may not be performed and step 240 may only involve estimating the amount of silicon using a single nuclear radiation component.

Figure 3:
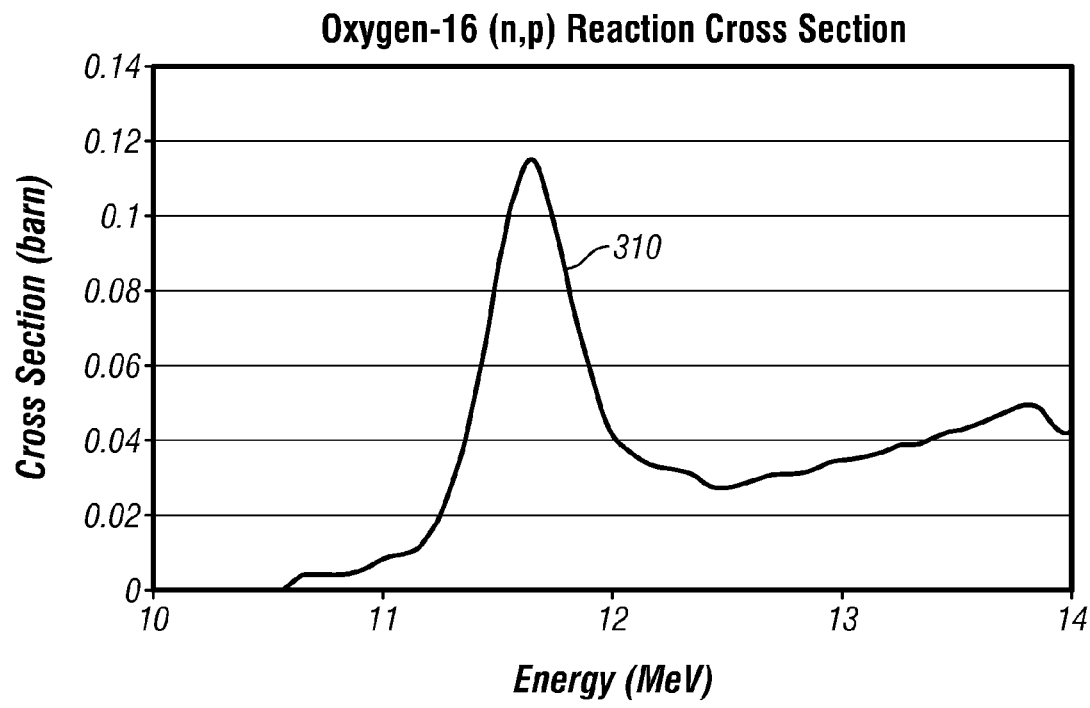
FIG. 3 shows a graph of the (n,p) reaction cross section for oxygen-16.
Figure 4:
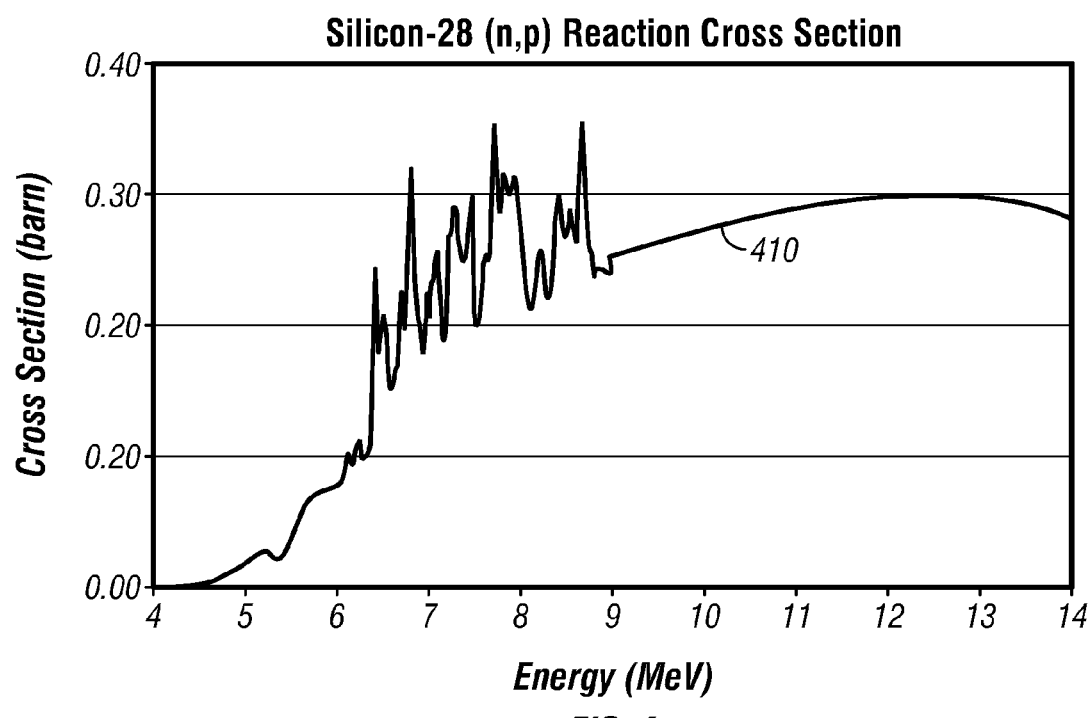
FIG. 4 shows a graph of the (n,p) reaction cross section for silicon-28.

Turning to method 200 in more detail, the at least one energy source 140 may be activated in step 210 at $t=t_0$ to build-up radioactive isotopes in the volume of interest 185. This build-up may last from $t_0$ to $t_1$ where elements may be activated based on the energy flux used to activate the elements. For example, FIG. 3 shows the reaction cross section of oxygen where curve 310 indicates the activation of oxygen based on energy level, and FIG. 4 shows the reaction cross section for silicon where curve 410 indicates the activation of silicon based on energy level. As can be seen in FIGS. 3 & 4, the energy flux used may need to be above approximately 10.5 MeV in order for both oxygen and silicon to be activated. Curves 310 and 410 show that silicon activation begins at lower energy levels than oxygen activation.

Figure 5:
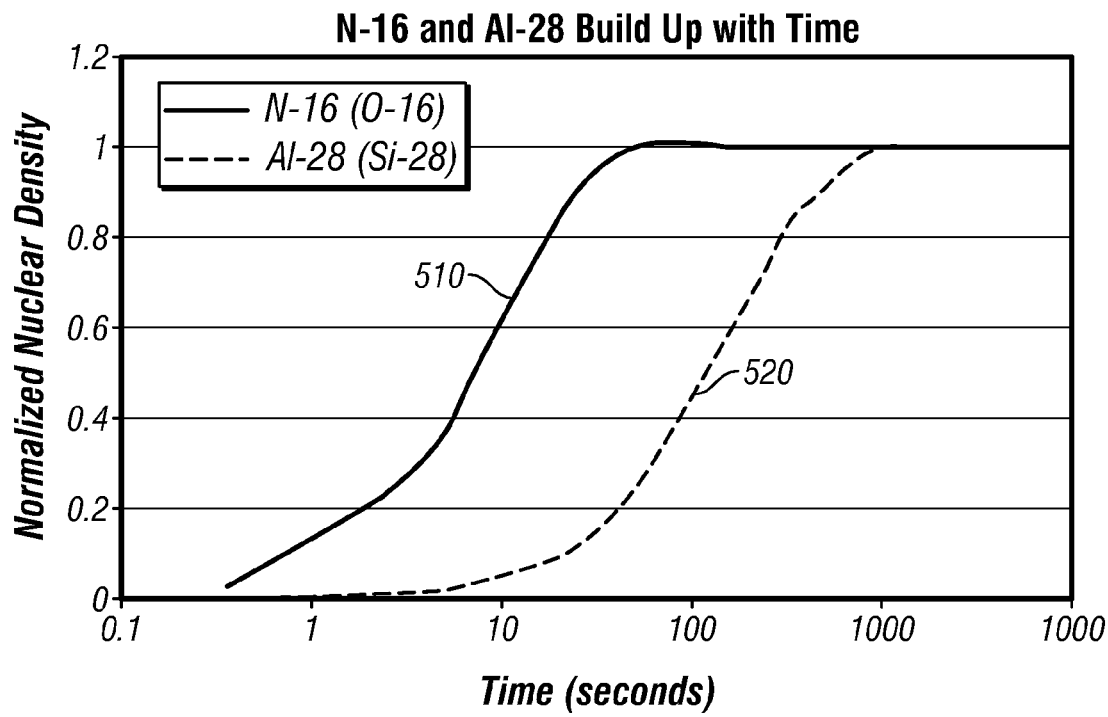
FIG. 5 shows a graphical illustration of the build-up of nitrogen-16 and aluminum-28 in a normalized sense when oxygen and silicon are exposed to the at least one energy source.

During the build-up period, the isotopes may be activated at different rates, as shown in FIG. 5. Curve 510 indicates the build-up nitrogen-16 due to oxygen activation; and curve 520 indicates the build-up of aluminum-28 due to silicon activation. At $t=t_1$, the at least one energy source 140 may be deactivated, which effectively pauses the application of neutrons to generate more radioactive isotopes.

The radioactive isotopes production term due to exposure to the at least one energy source 140 may be estimated by multiplying the energy flux (such as neutron flux) and the reaction cross section of the volume of interest in the formation such that:

$$Q(t) = \int_{E_{min}}^{\infty} \int_V \phi(t,\bar{r},E) \Sigma(\bar{r},E) dE d\bar{r} \qquad (1)$$

Therefore, in the case of nitrogen-16 build-up from oxygen, $Q_{N-16} = {}_7^{16}N$ production rate $$= \int_E \int_V \Sigma_p(\bar{r}, E)\phi(t, \bar{r}, E) d\bar{r} dE, \qquad (2)$$

$$= \int \int \sigma_{p,O-16}(E) N_{O-16}(\bar{r}) \phi(t, \bar{r}, E) d\bar{r} dE, \qquad (3)$$

and for constant N-16 production rates, N-16 nuclear density at $t=t_1$ is $$N_{N-16}(t.) = \frac{Q_{N-16}}{\lambda_{N-16}} \left[1 - e^{\lambda_{N-16}(t_1 - t_0)}\right], \qquad (4)$$

where,
$N_{N-16} = {}_7^{17}N$ nuclear density
$\lambda_{N-16} = {}_7^{16}N$ decay constant, and
$\sigma_{p,O-16} = $ O-16 microscopic (n,p) cross section In the case of aluminum-28 build-up from silicon-28, $Q_{Al-28} = {}_{13}^{28}Al$ production rate $$= \int_E \int_V \Sigma_p(\bar{r}, E) \phi(t, \bar{r}, E) d\bar{r} dE, \qquad (5)$$

-continued $$= \int_E \int_V \sigma_{p,Si-28}(E) N_{Si-28}(\bar{r}) \phi(t, \bar{r}, E) d\bar{r} dE, \quad (6)$$

and $$N_{Al-28}(t_1) = \frac{Q_{Al-18}}{\lambda_{Al-28}} [1 - e^{\lambda_{Al-28}(t_1-t_0)}] \quad (7)$$

where, $N_{Al-28} = {}^{28}_{13}Al$ nuclear density, $\lambda_{Al-28} = {}^{28}_{13}Al$ decay constant, and $\sigma_{p,Si-28}$=Si-28 microscopic (n,p) reaction cross section After build-up ends when $t=t_1$, the radioactive component due to simple decay at $t=t_2$ may be expressed as:

$$N_{N-16}(t_2) = N_{N-16}(t_1) e^{-\lambda_{N-16}(t_2-t_1)} \quad (8)$$

$$N_{Al-28}(t_1) = N_{Al-28}(t_1) e^{-\lambda_{Al-28}(t_2-t_1)} \quad (9)$$

Figure 6:
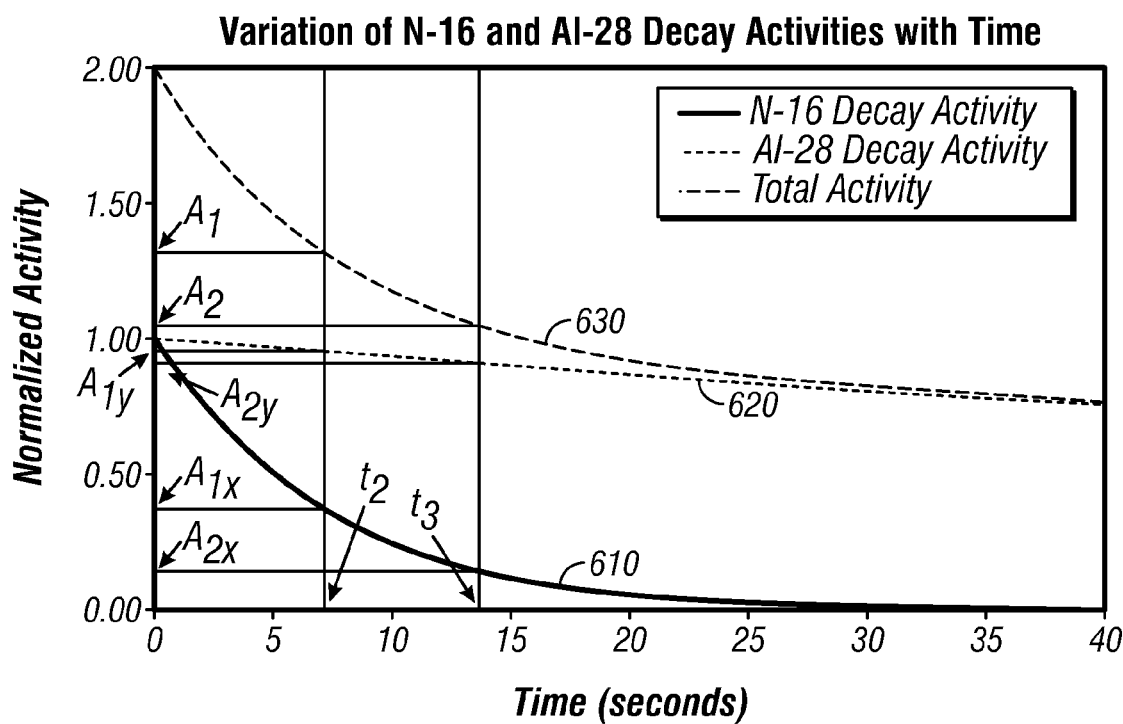
FIG. 6 shows a graphical illustration of total radiation and individual radiation component decay using one embodiment according to the present disclosure.

As the near (first) detector 130 take a reading at $t=t_2$ and the far (second) detector 120 takes a reading at $t=t_3$, the relative distribution of gamma photons coming from nitrogen-16 and aluminum-28 will be different. As shown in FIG. 6, the count 610 of nitrogen-16 gamma photons and the count 620 of aluminum-28 photons may be combined to form a gross nuclear radiation count 630, which is detected by the nuclear radiation detectors. The nitrogen-16 and aluminum-28 nuclear radiation components 610, 620 may be separated in step 230.

Where
$A_1$=data from 1st detector
$A_2$=data from 2nd detector
$\lambda_x = {}_7^{16}N$ decay constant
$\lambda_y = {}_{13}^{28}Al$ decay constant
$A_{1x}$=Counts from ${}_7^{16}N$ at $t=t_2$,
$A_{2x}$=Counts from ${}_7^{16}N$ at $t=t_3$,
$A_{1y}$=Counts form ${}_{13}^{28}Al$ at $t=t_2$,
$A_{2y}$=Counts from ${}_{13}^{28}Al$ at $t=t_3$, and
$\Delta t = t_3 - t_2$;
then the nuclear radiation counts may be expressed as:

$$A_1 = A_{1x} + A_{1y} \quad (10), \text{ and}$$

$$A_2 = A_{2x} + A_{2y} \quad (11).$$

The counts from the detectors at $t=t_3$ may be expressed as function of counts at $t=t_2$ such that $$A_{2x} = A_{1x} e^{-\lambda_x \Delta t} \quad (12)$$

and $$A_{2y} = A_{1y} e^{\lambda_y \Delta t} \quad (13).$$

Eqns. (12) and (13) may be substituted into Eqns. (10) and (11) as follows:

$$A_1 = A_{1x} + A_{1y} \quad (14)$$

$$A_2 = A_{1x} e^{-\lambda_x \Delta t} + A_{1y} e^{-\lambda_y \Delta t} \quad (15).$$

Then Eqn. (13) may be used to provide $A_{1x}$ to Eqn. (14) to produce $$A_2 = (A_1 - A_{1y}) e^{-\lambda_x \Delta t} + A_{1y} e^{-\lambda_y \Delta t} \quad (16).$$

Solving for $A_{1y}$, $$A_{1y}[e^{-\lambda_y \Delta t} - e^{-\lambda_x \Delta t}] = A_2 - A_1 e^{-\lambda_x \Delta t} \quad (17)$$

$$A_{1y} = \frac{A_2 - A_1 e^{-\lambda_x \Delta t}}{e^{-\lambda_y \Delta t} - e^{-\lambda_x \Delta t}}. \quad (18)$$

Thus $A_{1x}$ may also be obtained as:

$$A_{1x} = A_1 - A_{1y} \quad (19)$$

In step 240, the nuclear radiation counts due to the decay of nitrogen-16 and/or aluminum-28 may be used to estimate the amounts of oxygen and silicon. Generally, if number of decays can be correlated to the nuclear density for a specific nuclide by dividing the decay rate by the decay constant. In that regard, The nuclear density of nitrogen-16 at $t=t_2$ $$N_{N-16}(t_2) = N_{N-16}(t_1) e^{-\lambda_{N-16}(t_2-t_1)} \quad (20)$$

may be expressed in terms of $t=t_1$, $$N_{N-16}(t_2) = N_{N-16}(t_2) e^{\lambda_{n-16}(t_2-t_1)} \quad (21),$$

and the nuclear density of aluminum-28 at $t=t_2$ $$N_{Al-28}(t_1) = N_{Al-28}(t_2) e^{\lambda_{Al-28}(t_2-t_1)} \quad (22),$$

may be expressed in terms of $t=t_1$, $$N_{Al-28}(t_1) = N_{Al-28}(t_2) e^{\lambda_{Al-28}(t_2-t_1)} \quad (23).$$

Using the build-up equation $$N_{N-16}(t_1) \sim \frac{O_{N-16}}{\lambda_{N-16}} [1 - e^{-\lambda_{N-20}(t_2-t_v)}], \quad (24)$$

and $$N_{N-16}(t_1) \sim \frac{\int \int r_{p,o}(E) N_{O-16}(r) \phi(t, \bar{r}, E) d\bar{r} dE}{\lambda_{N-16}} [1 - e^{-\lambda_{N-26}(t_2-t_0)}]. \quad (25)$$

A time independent constant shape for $\phi(\bar{r},E)$ and a homogeneous formation may yield $$N_{N-16}(t_1) = \frac{V N_{O-16} \int \tau_p(E) \phi(E) dE}{\lambda_{N-16}} [1 - e^{-\lambda_{N-16}(t_2-t_0)}]. \quad (26)$$

By defining a constant, $C_{O-16}$, $$C_{O-16} = V N_{O-16} \int r_p(E) \phi(E) dE \quad (27),$$

then the oxygen and silicon concentrations in the formation can be estimated by using the expressions given by equations (28) and (29).

$$N_{O-16} \sim C_{O-16} \frac{\lambda_{N-16} N_{N-16}(t_2)}{[1 - e^{-\lambda_{N-16}(t_1-t_0)}]} \quad (28)$$

and $$N_{Si-28} \sim C_{Si-28} \frac{\lambda_{Al-28} N_{Al-28}(\tau_1)}{[1 - e^{-\lambda_{Al-28}(t_1-t_0)}]}. \quad (29)$$

Figure 7:
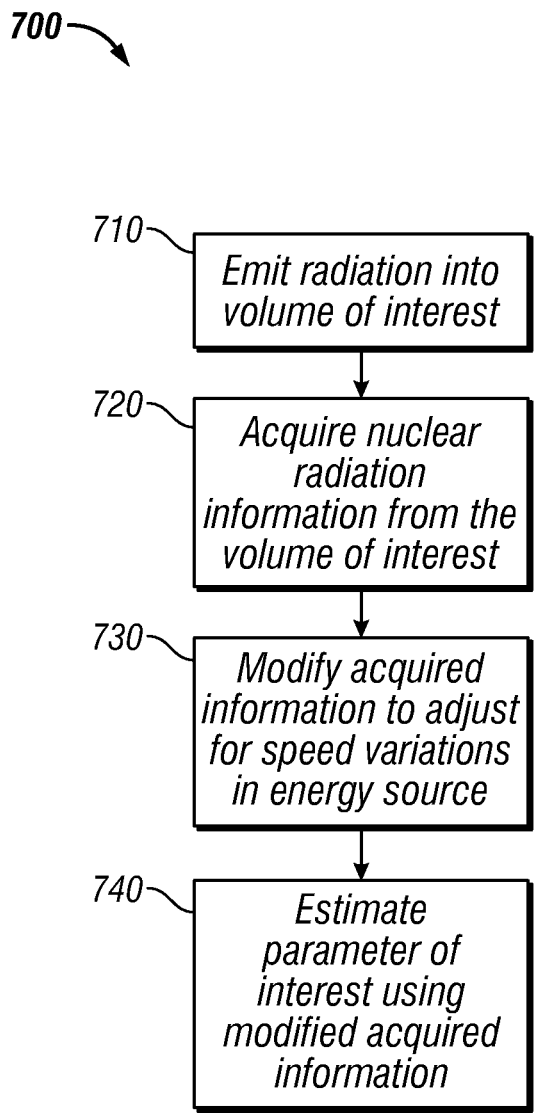
FIG. 7 shows a flow chart of an estimation method for one embodiment according to the present disclosure.

FIG. 7 shows, in flow chart form, an exemplary method 700 according to the present disclosure for estimating at least one parameter of interest of the formation 180 (FIG. 1) using a model based on information acquired from at the two gamma ray detectors 120, 130 (FIG. 1). Referring now to FIGS. 1 and 7, method 700 may include step 710, where the at least one energy source 140 emits a nuclear radiation pulse in proximity to a volume of interest 185 of the formation 180. In step 720, the resulting interactions between the pulse and the material of the formation result in nuclear radiation that may be detected by the nuclear radiation detectors 130, 120 as the nuclear radiation detectors 120, 130 move past, or in proximity to, the volume of interest 185. The detectors 120, 130 may produce a signal with the prompt and/or delayed nuclear radiation information acquired from the volume of interest 185. In step 730, the information may be modified using exposure time information for the at least one energy source 140 and/or the detectors 120, 130 to compensate for uneven activation of silicon and oxygen in the volume of interest 185 of the formation. In step 740, the at least one parameter of interest may be estimated using the modified information.

Figure 8:
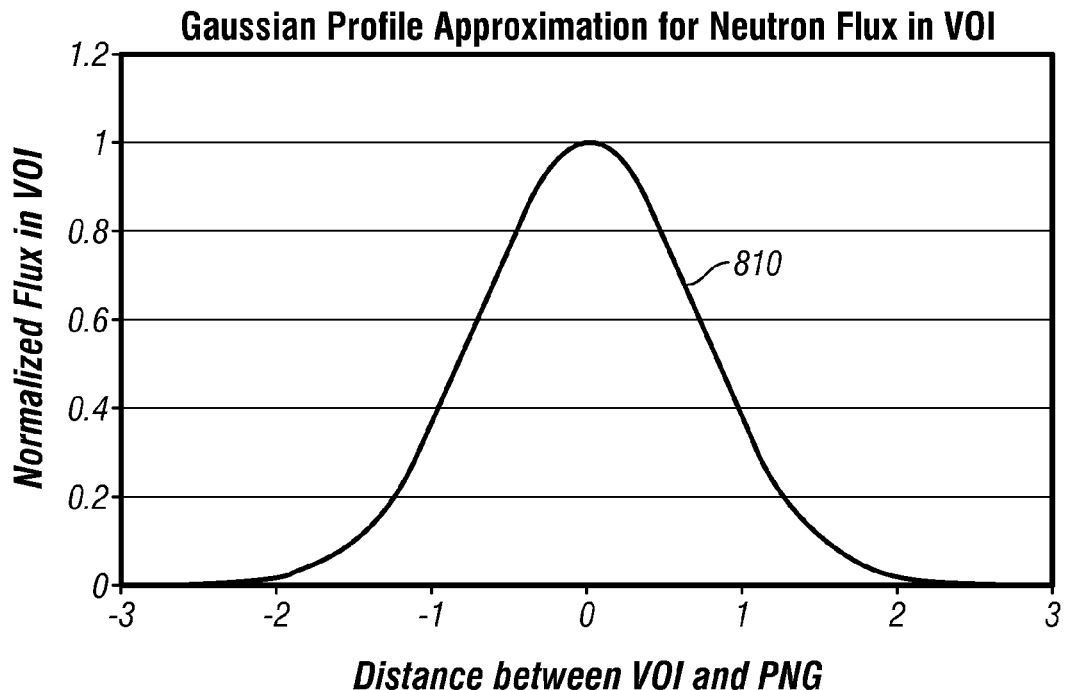
FIG. 8 shows a graphical illustration of neutron flux on a volume of interest.

Throughout the build-up, the at least one energy source 140 may be moving along the borehole 150. The build-up in portions of the volume of interest 185 may be affected by variations in the energy flux, such as due to changes in the speed and to changes in the distance between the volume of interest 185 and the at least one energy source 140. In some embodiments, the time dependent neutron flux profile may be approximated by assuming flux distribution in a Gaussian shape, though flux distributions may occur in other shapes, as a function of distance between the volume of interest 185 and the at least one energy source 140 as shown in curve 810 of FIG. 8. However, the shape of the flux may be affected by variations in speed of the at least one energy source 140 and/or the nuclear radiation detectors 120, 130 as approximated using the formulas:

$$\frac{dN}{dt} = -\lambda N(t) + Q(t), \text{ and} \tag{30}$$

$$N(t) = N(t_0)e^{-\lambda t} + e^{-\lambda t}\int_{t_0}^{t} Q(t')e^{\lambda t'}dt' \tag{31}$$

where nuclear reaction rate profile, Q(t), has a Gaussian shape in time due to the flux profile. Since most of the nuclides used in formation evaluation decay quite rapidly, we may safely assume that there were not any of those present in the formation to begin with. In that case, we assume the terms N(t)=0 at t=$t_0$.

Figure 9:
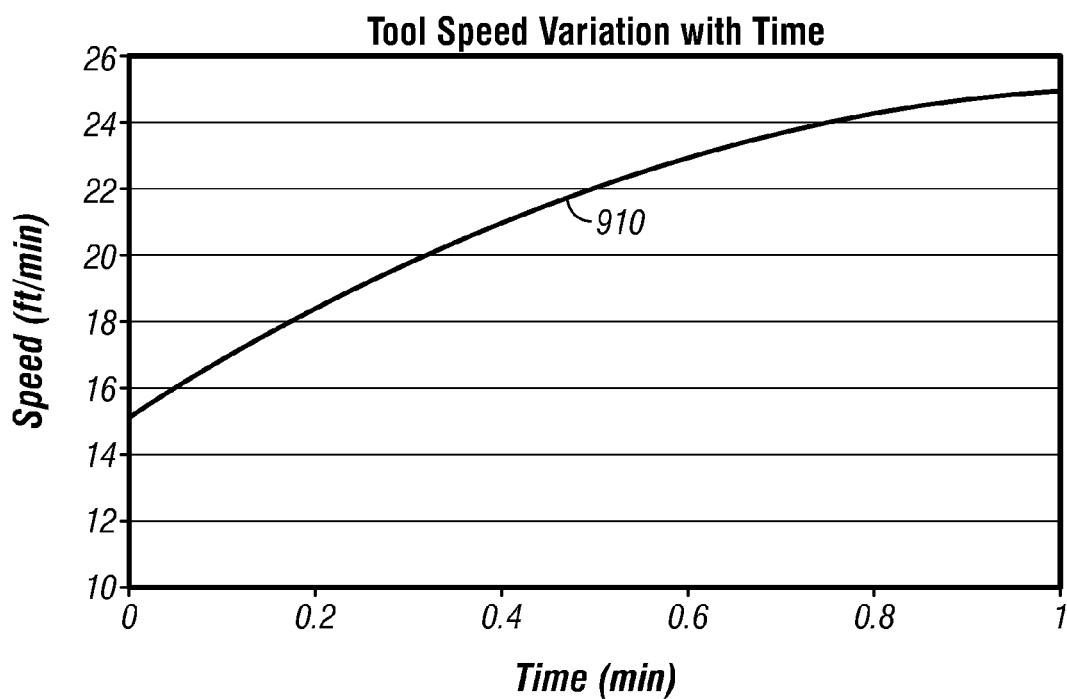
FIG. 9 shows a graphical illustration of tool speed variation from 15 ft/min to 25 ft/min according to one embodiment of the present disclosure.

In step 730, the effects of variations of speed of the at least one energy source and/or at least one nuclear radiation detector may be reduced. In one embodiment, the speed of the at least one energy source may be modeled mathematically. The use of mathematical model is illustrative and exemplary only, as other models may be used as known by those of skill in the art. FIG. 9 shows a mathematical model of the speed of the at least one energy source 140 using a second order polynomial, $$v(t) = at^2 + bt + c \tag{32},$$

so that the speed variations may be seen in curve 910.
Thus, the distance traveled by the at least one energy source 140 for a given time frame is $$Z = \int_{t_0}^{t}[at^2+bt+c]dt = \frac{at^3}{3}+\frac{bt^2}{2}+ct+d\Big|_{t_0}^{t}. \tag{33}$$

Thus, $$Z = \frac{at^3}{3}+\frac{bt^2}{2}+ct+Z_{min} \tag{34}$$

when $t_0=0$

Substituting Z for t in Q(t) yields $$Q(z) = e^{eZ^2} = e^{e\left[\frac{at^2}{3}+\frac{bt^2}{2}+ct+Z_{min}\right]^2}. \tag{35}$$

Then N(t) may be determined, $$N(t) = e^{-\lambda t}\int_{t_0}^{t} Q(t')e^{\lambda t'}dt' \tag{36}$$

$$= e^{-\lambda \tau}\int e^{e\left[\frac{at^2}{s}\Big|\frac{bt^2}{s}\Big|ct'\Big|z_{min}\right]^2}e^{\lambda t}dt.$$

Figure 10:
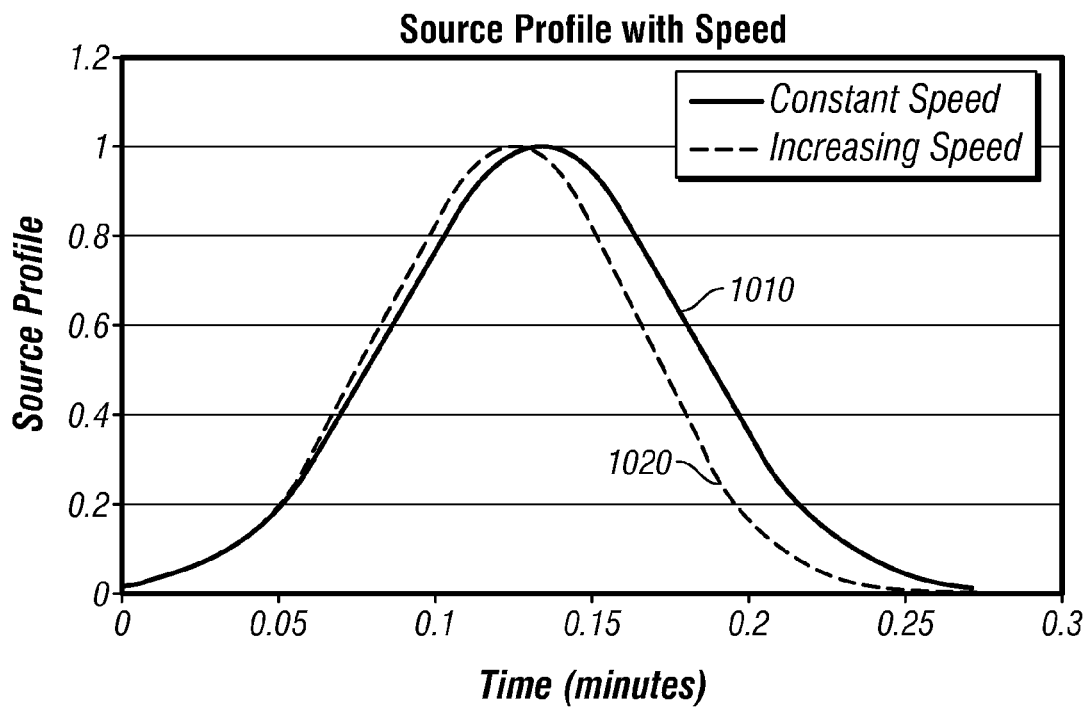
FIG. 10 shows a graphical illustration comparing normalized neutron flux profiles at a point of interest with a constant speed and increasing speed energy source.

The speed of the at least one energy source 140, which may be determined from the speed of the tool on which the at least one energy source is operably connected, may be used to estimate the values of coefficients a, b, c, and e. In some embodiments, the values of coefficients a, b, c and e may be estimated using the speed of the at least one nuclear radiation detector. In another embodiment, the coefficients may be estimated using the speed of the at least one energy source and of at least one nuclear radiation detector. In yet another embodiment, the coefficients may be determined using exposure time information, which may be derived from speed information or obtained independently. FIG. 10 shows the variations in energy flux at the volume of interest 185 based an assumed constant speed 1010 and with correction for speed variation 1020.

Since there may not be further build-up beyond $t_1$, the nuclear densities of nitrogen-16 and aluminum-28 may be set as follows:

$$N_{N-16}(t_1) = \tag{36}$$
$$e^{-\lambda_{N-16}t_1}\int_{t_0}^{t_1} e^{e_{N-26}\left[\frac{a_{N-26}t'^3}{3}+\frac{b_{N-26}t'^2}{2}+c_{N-16}t'+Z_{min}\right]^2}e^{\lambda_{N-16}t}dt'$$

$$N_{Al-28}(t_1) = \tag{37}$$
$$e^{-\lambda_{Al-28}t_2}\int_{t_0}^{t_1} e^{e_{Al-28}\left[\frac{a_{Al-28}t^2}{2}+\frac{b_{Al-28}t^2}{2}+c_{Al-28}t'+Z_{min}\right]^2}e^{\lambda_{Al-28}t}dt'$$

In some embodiments, elements of method 200 and elements of method 700 may be combined such that the at least one parameter of interest may be estimated using nuclear radiation information that has been modified to compensate for speed variations and separated into at least two radiation components.

Figure 11:
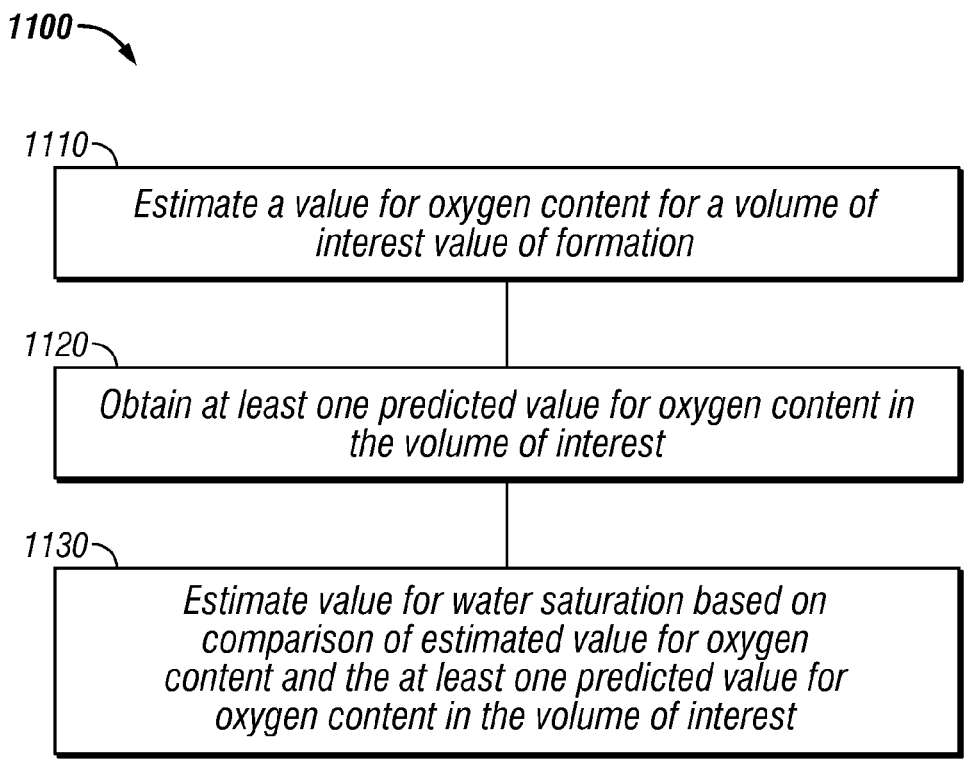
FIG. 11 shows a flow chart of an estimation method for one embodiment according to the present disclosure.

FIG. 11 shows, in flow chart form, an exemplary method 1100 according to the present disclosure for estimate at least one parameter of interest of the formation 180 (FIG. 1) using an oxygen content value. In step 1110, a value for oxygen content may be estimated for a volume of interest of a formation. In step 1120, at least one predicted value for oxygen content of the volume of interest based on the formation lithology may be obtained. In some embodiments, the at least one value for oxygen content of the volume of interest may be a predicted minimum value for oxygen and a predicted maximum value for oxygen in the volume of interest based on formation lithology. In some embodiments, the predicted maximum value for oxygen may correspond to a water-filled porosity for the volume of interest, and the predicted minimum value for oxygen may correspond to an oil-filled porosity for the volume of interest. The at least one predicted value may be obtained through direct measurement, indirect measurement, historical analysis, interpolation, professional expertise, modeling, or combinations thereof. In some embodiments, the at least one predicted value may be modified using information regarding one or more of: (i) changes in borehole size, (ii) completion hardware, (iii) clay type, and (iv) lithology, (v) source speed, (vi) source intensity. In step 1130, a value for water saturation may be estimated using a comparison of the estimated value for oxygen content and the at least one predicted value for oxygen content.

Figure 12:
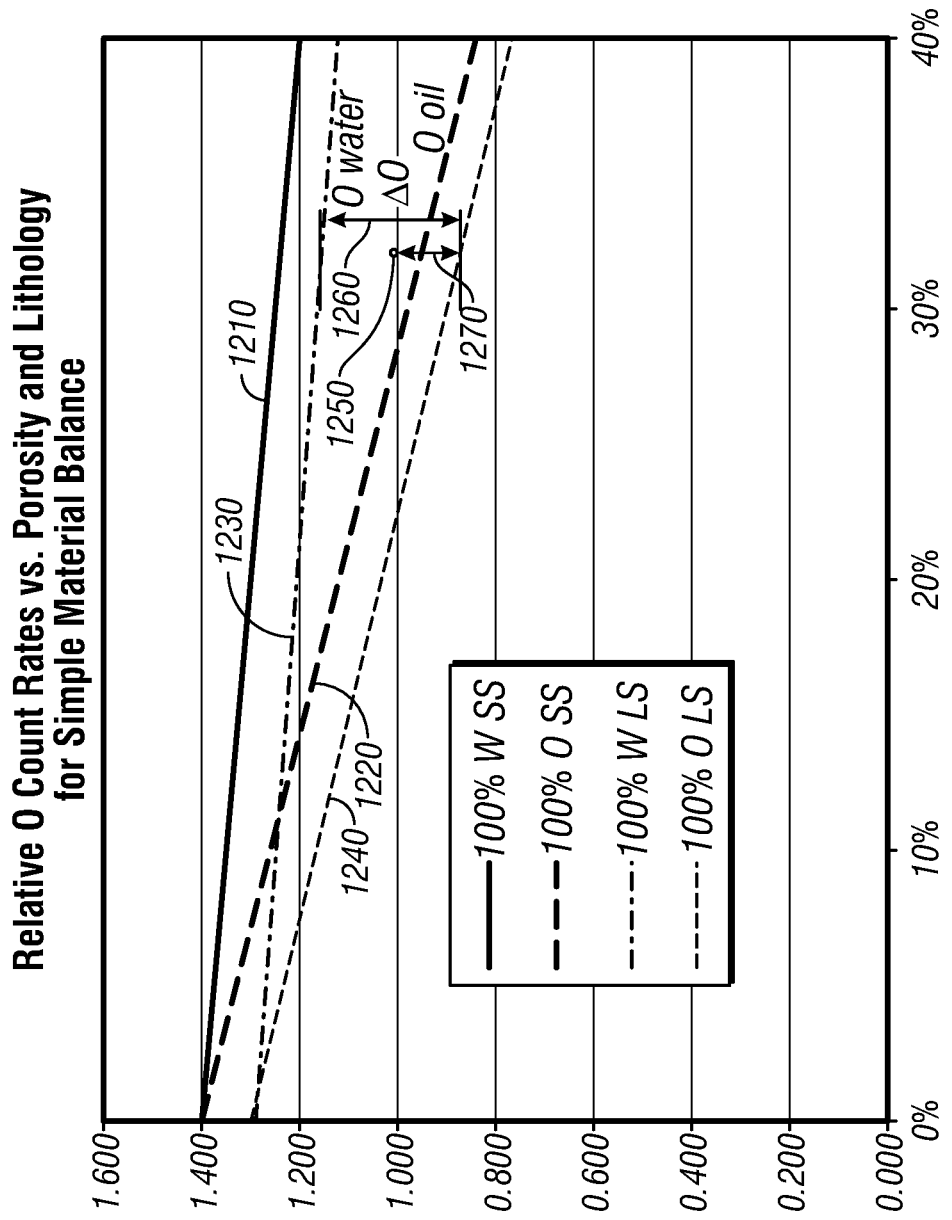
FIG. 12 shows a graphical illustration of estimated and predicted oxygen contents for a volume of interest according to one embodiment of the present disclosure.

FIG. 12 shows a graphical representation of a predicted minimum value for oxygen content and a predicted maximum value for oxygen content for a formation with a certain lithology. Shown are gamma counts associated with sandstone (SS) limestone (LS) where the volume of interest 185 is activated. Curve 1210, (100% W SS), illustrates the nuclear radiation count for sandstone when 100 percent water is present in the pores of the formation. Curve 1220, (100% O SS), illustrates the nuclear radiation count for sandstone when 100 percent oil is present in the pores of the formation. Curve 1230, (100% W LS), illustrates the nuclear radiation count for limestone when 100 percent water is present in the pores of the formation. Curve 1240, (100% O LS), illustrates the nuclear radiation count for limestone when 100 percent oil is present in the pores of the formation. Point 1250 represents the estimated oxygen content. Range 1260 is the band between 100 percent water curve 1220 and 100 percent oil curve 1240 (ΔO) limestone. Finally, range 1270 is the difference between the estimated oxygen content and the 100 percent oil curve 1240. In one embodiment, a value for water saturation may be estimated using the size of range 1270 and the size of range 1260. While FIG. 12 describes an embodiment of the present disclosure in terms of limestone and sandstone, this is exemplary and illustrative only, as embodiments will also work with dolomite, other mineralogies, and combinations of mineralogies.

Figure 13:
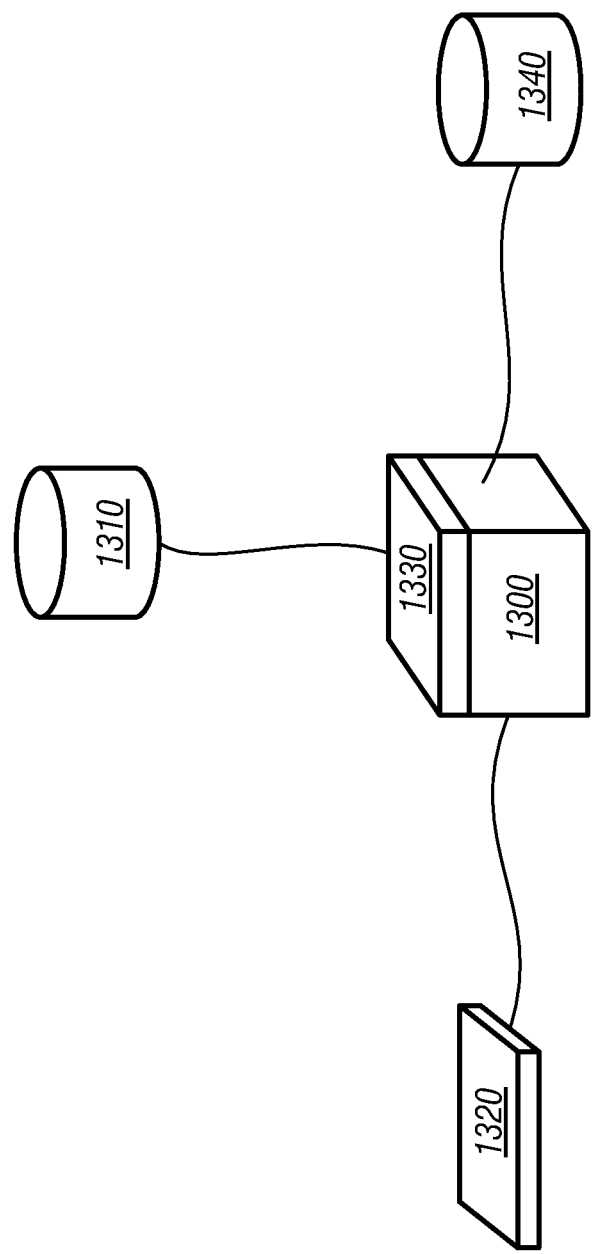
FIG. 13 shows a schematic of the apparatus for implementing one embodiment of the method according to the present disclosure.

As shown in FIG. 13, certain embodiments of the present disclosure may be implemented with a hardware environment that includes an information processor 1300, a information storage medium 1310, an input device 1320, processor memory 1330, and may include peripheral information storage medium 1340. The hardware environment may be in the well, at the rig, or at a remote location. Moreover, the several components of the hardware environment may be distributed among those locations. The input device 1320 may be any information reader or user input device, such as data card reader, keyboard, USB port, etc. The information storage medium 1310 stores information provided by the detectors. Information storage medium 1310 may be any standard non-transitory computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 1310 stores a program that when executed causes information processor 1300 to execute the disclosed method. Information storage medium 1310 may also store the formation information provided by the user, or the formation information may be stored in a peripheral information storage medium 1340, which may be any standard computer information storage device, such as a USB drive, memory stick, hard disk, removable RAM, or other commonly used memory storage system known to one of ordinary skill in the art including Internet based storage. Information processor 1300 may be any form of computer or mathematical processing hardware, including Internet based hardware. When the program is loaded from information storage medium 1310 into processor memory 1330 (e.g. computer RAM), the program, when executed, causes information processor 1300 to retrieve detector information from either information storage medium 1310 or peripheral information storage medium 1340 and process the information to estimate at least one parameter of interest. Information processor 1300 may be located on the surface or downhole.

In some embodiments, shielding of the detectors may be implemented for neutrons and gamma rays. Gamma ray shielding prevents the detection of gamma rays from behind the tool and from that originating within the tool. Neutron shielding prevents neutrons from reaching the detector regions and inducing gamma rays. Combinations of neutron moderators, neutron absorbers, high hydrogen content epoxies, and high-density high-Z materials are known to those skilled in the art.

While the foregoing disclosure is directed to the one mode embodiments of the disclosure, various modifications will be apparent to those skilled in the art. It is intended that all variations be embraced by the foregoing disclosure.

What is claimed is:

1. A method for estimating at least one parameter of interest of a formation, comprising:
   estimating the at least one parameter of interest using information from at least one nuclear radiation detector in a borehole in the formation representative of nuclear radiation from an activated volume of interest in the formation, and exposure time information relating to exposure of the activated volume to at least one energy source, comprising:
   estimating exposure time information using variations in speed of at least one of: i) motion of the at least one energy source; and ii) motion of the at least one radiation detector.

2. The method of claim 1, further comprising:
   activating a volume of interest of the formation with the at least one energy source to create the activated volume.

3. The method of claim 2, wherein the at least one energy source includes at least one of: (i) a pulsed neutron source and (ii) a constant neutron source.

4. The method of claim 2, further comprising estimating exposure time information using speed information relating to at least one of: i) motion of the at least one energy source; and ii) motion of the at least one radiation detector.

5. The method of claim 1, wherein the exposure time information is associated with at least one of: (i) the at least one nuclear radiation detector and (ii) the at least one energy source.

6. The method of claim 1, further comprising:
   conveying the at least one nuclear radiation detector in a borehole.

7. The method of claim 1 wherein the exposure time information comprises information relating to at least one of: (i) a time period that the activated volume of interest is exposed to the active energy source, (ii) a time period that the at least one nuclear radiation detector is exposed to nuclear radiation emitted by the activated volume of interest, and (iii) the intervening period between exposure of the activated volume of interest and exposure of the at least one nuclear radiation detector by the activated volume of interest.

8. The method of claim 1 further comprising using the exposure time information to modify a neutron flux profile of the nuclear radiation information.

9. The method of claim 1, wherein the at least one parameter of interest is at least one of: (i) a silicon content, (ii) an oxygen content, (iii) a sodium content, (iv) an iodine content, and (v) an iron content, (vi) an aluminum content, and (vii) a magnesium content.

10. An apparatus for estimating at least one parameter of interest of a formation, comprising:
  a carrier;
  at least one nuclear radiation detector conveyed by the carrier and configured to generate information representative of nuclear radiation from an activated volume of interest in the formation; and
  an information processing device configured to estimate the at least one parameter of interest using the nuclear radiation information and exposure time information relating to exposure of the activated volume to at least one energy source by estimating exposure time information using variations in speed of at least one of: i) motion of the at least one energy source; and ii) motion of the at least one radiation detector.

11. The apparatus of claim 10, further comprising:
  the at least one energy source, configured to activate the volume of interest.

12. The apparatus of claim 11, wherein the at least one energy source includes at least one of: (i) a pulsed neutron source and (ii) a constant neutron source.

13. The apparatus of claim 10, wherein the carrier is configured to be deployed in a borehole.

14. The apparatus of claim 10, wherein the nuclear radiation information comprises a nuclear radiation count.

15. The apparatus of claim 10, where the information processing device comprises:
  a processor; and
  a memory storage medium.

16. The apparatus of claim 10, further comprising:
  at least one sensor in communication with the information processing device and configured to estimate exposure time.

17. A non-transitory computer-readable medium product having stored thereon instructions that, when executed by at least one processor, perform a method the method comprising:
  estimating the at least one parameter of interest using information acquired from at least one nuclear radiation detector in a borehole in a formation and representative of nuclear radiation from an activated volume of interest in the formation, and exposure time information relating to exposure of the activated volume to at least one energy source, comprising:
    estimating exposure time information using variations in speed of at least one of: i) motion of the at least one energy source; and ii) motion of the at least one radiation detector.

18. The non-transitory computer-readable medium product of claim 17 further comprising at least one of: (i) a ROM, (ii) an EPROM, (iii) an EEPROM, (iv) a removable RAM, (v) a flash memory, and (vi) an optical disk.

* * * * *